United States Patent
Zanuccoli et al.

(12)

(10) Patent No.: US 6,448,842 B2
(45) Date of Patent: Sep. 10, 2002

(54) HIGH-EFFICIENCY BIDIRECTIONAL VOLTAGE BOOSTING DEVICE

(75) Inventors: Mauro Zanuccoli, Cesenatico; Roberto Canegallo, Tortona; Davide Dozza, Villanova, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/788,623

(22) Filed: Feb. 13, 2001

(30) Foreign Application Priority Data

Feb. 15, 2000 (IT) ......................................... TO20A0146

(51) Int. Cl.[7] ................................................ G05F 1/10
(52) U.S. Cl. .......................... 327/536; 327/589; 363/59
(58) Field of Search ................................ 327/536, 537, 327/589, 590, 390; 307/110; 363/59, 60; 326/88

(56) References Cited

U.S. PATENT DOCUMENTS

| | | | | |
|---|---|---|---|---|
| 5,335,200 A | * | 8/1994 | Coffman et al. ............. | 365/218 |
| 5,754,476 A | * | 5/1998 | Caser et al. ............ | 365/185.29 |
| 5,912,560 A | * | 6/1999 | Pasternak .................... | 327/536 |
| 6,075,402 A | * | 6/2000 | Ghilardelli et al. ......... | 327/536 |
| 6,292,048 B1 | * | 9/2001 | Li ............... | 327/536 |

FOREIGN PATENT DOCUMENTS

| | | |
|---|---|---|
| EP | 0 822 556 A1 | 2/1998 |
| EP | 0 836 268 A1 | 4/1998 |
| EP | 0 843 402 A1 | 5/1998 |

* cited by examiner

Primary Examiner—Timothy P. Callahan
Assistant Examiner—An T. Luu
(74) Attorney, Agent, or Firm—Lisa K. Jorgenson; E. Russell Tarleton; SEED IP Law Group PLLC

(57) ABSTRACT

A voltage boosting device having a charge pump circuit formed by a plurality of voltage boosting stages cascade-connected together. Each voltage boosting stage is connected to the adjacent stages via a first transfer node and a second transfer node and includes a storage capacitor connected at a terminal thereof to the second transfer node and receiving on the other terminal a first phase signal switching between a first value and a second value; a switch element including an NMOS transistor connected between the first transfer node and the second transfer node; a voltage boosting capacitor connected at a terminal thereof to the control terminal of the switch element and receiving on the other terminal a second phase signal; a first precharge circuit connected between the first transfer node and the control terminal of the switch element so as to control charge transfer from the first transfer node to the second transfer node when activated by a first activation signal; and a second precharge circuit connected between the second transfer node and the control terminal of the switch element so as to control charge transfer from the second transfer node to the first transfer node when activated by a second activation signal. The first activation signal and second activation signal are never active simultaneously.

18 Claims, 5 Drawing Sheets

HIGH-EFFICIENCY BIDIRECTIONAL VOLTAGE BOOSTING DEVICE

TECHNICAL FIELD

The present invention relates to a high-efficient bidirectional voltage boosting device.

BACKGROUND OF THE INVENTION

As is known, inside single-supply non-volatile memories, use is made of both positive and negative voltage boosting devices, such as charge pumps, that generate internally the required voltages to carry out programming, reading, and erasing. The area provided for these charge pumps represents a significant fraction (typically approximately 10%) of the overall surface area of the integrated device. Normally, inside the device, the positive charge pumps are distinct from the negative ones, thus making the bulk problem even more serious.

Both positive and negative charge pump architectures are known, including a certain number of stages, each comprising a (high-value) boosting capacity, and a switch which is closed or opened in counterphase with the adjacent stage. Charge is transferred from one stage to another (towards the output for positive pumps, towards the supply stage for negative pumps), as controlled by complementary phase signals. The switch is formed y diodes (for example MOS transistors, which have gate and drain terminals connected to one another), or by MOS transistors.

The main problem with using diodes is associated with the threshold voltage of the diodes, which involves firstly dissipation, and secondly reduction of the maximum voltage at the output of the charge pump. In general, for a positive charge pump, if N is the number of stages and $V_{DD}$ is the supply voltage, the asymptotic value of the output voltage $V_{OUT}$ is equal to:

$$V_{OUT}=(N+1)(V_{DD})-NV_T,$$

where $V_T$ is the threshold voltage of the diodes.

In the case of negative pumps, the asymptotic value of the output is:

$$V_{OUT}=(N+1)(i\ V_{DD}-V_T)$$

The solution which uses NMOS transistors is intended to solve the above-described problem, and requires the use of four phase signals, i.e., two driving signals for the high capacities, and two driving signals for the switches.

However, this solution also is not free from problems. In fact, MOS transistors also have threshold voltage problems, and in addition the dependence of the threshold voltage on the source-body voltage drop (the so-called body effect) is detrimental in terms of conductivity of the switches, particularly at high voltages, and thus in particular for the stages that are closest to the output.

The problem of the body effect has been solved by isolating the body region of the NMOS transistor through an isolated well (triple-well transistor), and biasing the body well to a voltage set by an appropriate circuit. In the case of NMOS switches, triple-well transistors are typically used.

An embodiment of a positive pump with switches formed by NMOS transistors with four phases and good performance in terms of efficiency, is described in EP-A-0 836 268.

Negative pumps which use the same technique have also been presented (see for example EP-A-0 843 402).

In both cases, the biasing of the wells takes place through a divider, which, in a specific manner to each well, can generate biasing voltages comprised between ground and the output voltage Vour of the charge pump, and can therefore meet the following two requirements:

1. The well of the NMOS transistor that operates as a switch must be biased to a voltage value that is no higher than the minimum potential present at the drain or source terminals, in order to prevent direct biasing of the bulk-source and bulk-drain junctions.

2. The body well of the NMOS transistor that operates as a switch may not be biased to a voltage value that is excessively low, such as to reduce the body effect as far as possible, and therefore maintain adequate conductivity of the NMOS transistor, even at high voltages.

Finally, a two-phase bidirectional charge pump is known, which uses diodes as switches, as described for example in EP-A-0 822 556. In this known bidirectional charge pump, the input stage is provided with a first switch that, when operating as a positive charge pump, connects the input of the pump to the supply line, and otherwise is open; in addition, the output is provided with a second switch, which, when operating as a negative charge pump, connects the output to ground, and otherwise is open.

Since this bidirectional charge pump uses diodes as switches, it is affected by the above-described problems.

SUMMARY OF THE INVENTION

The object of the present invention is to provide a bidirectional voltage boosting device that uses NMOS transistors as switches, such as to obtain the above-described advantages relative to this solution.

According to the present invention, a bidirectional voltage boosting device is provided, the device including a phase generator stage generating phase signals, a charge pump circuit having an input and an output with phase inputs receiving the phase signals, the charge pump circuit having a plurality of voltage boosting stages cascade connected between the input and the output, each voltage boosted stage defining a first and a second transfer node connected to a respective adjacent voltage boosting stage. Each voltage boosting stage includes a storage capacitor with a first and a second terminal, the first terminal of the storage capacitor receiving a first one of the phase signals, the second terminal of the storage capacitor being connected to the second transfer node; a switch element formed by an NMOS transistor having a first and a second conduction terminal and a control terminal, the first and second conduction terminals connected respectively to the first transfer node and to the second transfer node; a voltage boosting capacitor having a first terminal receiving a second one of the phase signals, and a second terminal connected to the control terminal of the switch element; a first precharge circuit connected between the first transfer node and the control terminal of the switch element to control charge transfer from the first node to the second node, the first precharge circuit having an activation terminal receiving a first activation signal; and a second precharge circuit connected between the second transfer node and the control terminal of the switch element to control charge transfer from the second transfer node to the first transfer node, the second precharge circuit having an activation terminal receiving a second activation signal. Ideally, the first and second activation signals are never active simultaneously.

In accordance with another aspect of the invention, a voltage boosting circuit is provided that includes a plurality of voltage boosting stages connected in cascade, each voltage boosting stage connected to adjacent stages by first and second transfer nodes. Each voltage boosting stage includes a switch element with a first terminal coupled to the first transfer node, a second terminal coupled to the second transfer node, and a control terminal; a first precharge circuit having a first terminal coupled to a first transfer node, a second terminal coupled to a control terminal of the switch element, and a control terminal coupled to a first activation signal source, the first precharge circuit configured to control charge transfer from the first transfer node to the second transfer node; and a second precharge circuit comprising a first terminal coupled to the second transfer node, a second terminal coupled to the control terminal of the switch element, and a control terminal coupled to a second activation signal source, the second precharge circuit configured to control charge transfer from the second transfer node to the first transfer node.

BRIEF DESCRIPTION OF THE DRAWINGS

In order to assist understanding of the invention, an embodiment is now described, purely by way of non-limiting example, and with reference to the attached drawings, wherein.

DETAILED DESCRIPTION OF THE INVENTION

Figure 1:
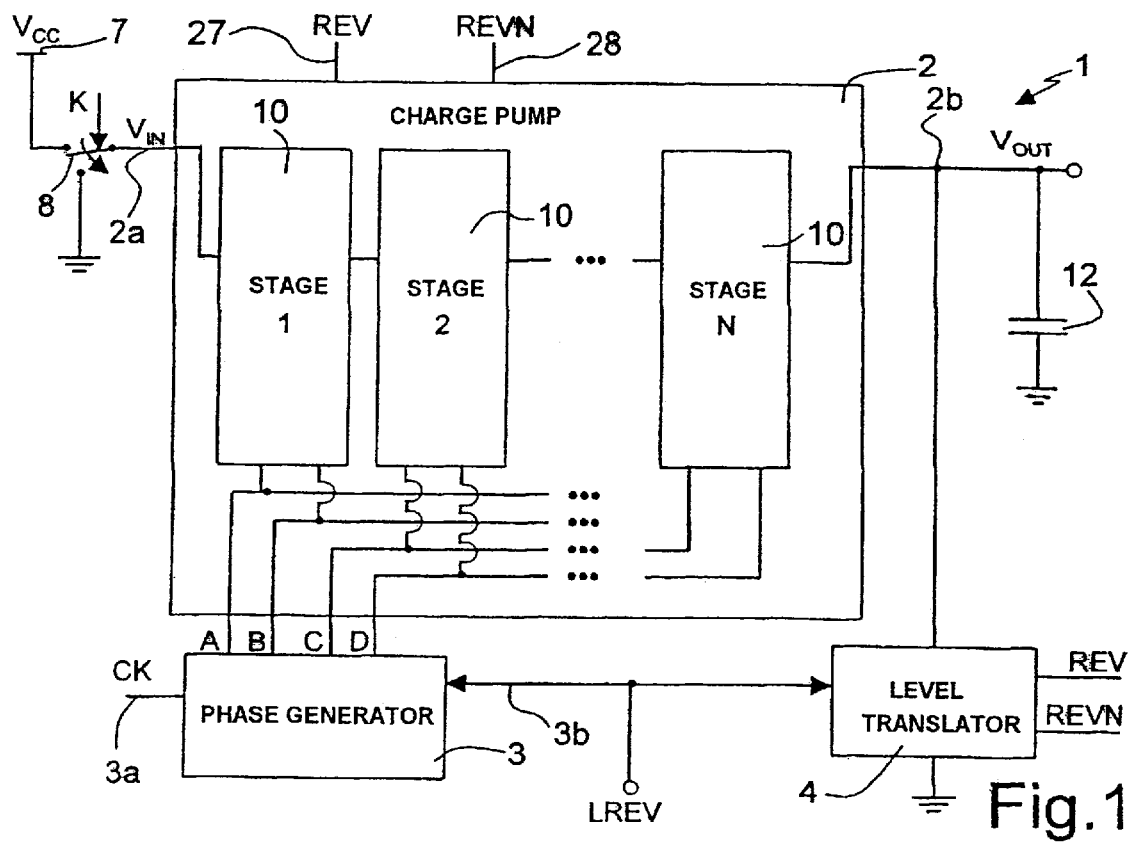
FIG. 1 illustrates a block diagram of a voltage boosting device according to the invention.

In FIG. 1, a bidirectional voltage boosting device 1 is shown having a charge pump circuit 2, a phase generator stage 3, and a level translator 4.

In detail, the charge pump circuit 2 has an input 2a, receiving an input voltage $V_{IN}$ and an output 2b, supplying an output voltage $V_{OUT}$. The input 2a of the charge pump circuit 2 is connected selectively to a supply line 7, set to a supply voltage $V_{DD}$ (for example 3 V) or to ground, via a selector 8 controlled by a control signal K. The charge pump circuit 2 is formed by a plurality N of voltage boosting stages 10, which are cascade-connected between the input 2a and the output 2b of the charge pump circuit 2, and each receive two of four phase signals A, B, C and D supplied by the phase-generator stage 3; in detail, the odd voltage boosting stages 10 receive the phase signals A, B, and the even voltage boosting stages 10 receive the phase signals C, D.

The phase-generator stage 3 is a logic circuit of a generally known type, with a first input 3a which receives a clock signal CK, a second input 3b which receives a logic signal LREV, indicative of the required functioning state (positive or negative) of the voltage boosting device 1, and four outputs, which supply the phase signals A, B, C, D.

The phase signals A, B, C, D are logic signals which switch between $V_{DD}$ and 0 V, and the behavior of which depends on the required functioning condition, as described in detail hereinafter.

The logic signal LREV is supplied from the outside, for example by a non-volatile memory (not shown), which incorporates the voltage boosting device 1, on the basis of the required functioning.

The level translator 4, of a known type, and not illustrated in detail, is connected between the output 2b of the charge pump circuit 2 and ground, and has a signal input which receives the logic signal LREV, and two outputs, which supply first and second high-voltage signals REV and REVN, opposite to each other, the high or low value of which is determined by the high or low level of the logic signal LREV. In particular, when the charge pump circuit 2 must operate as a positive voltage boosting device, the logic signal LREV has a first logic value (for example high), the first high-voltage signal REV is set to 0 V, and the second high-voltage signal REVN is equal to the output voltage $V_{OUT}$; when the charge pump circuit 2 must operate as a negative voltage boosting device, the logic signal LREV has a second logic value (for example low), the first high-voltage signal REV is equal to the output voltage $V_{OUT}$, and the second high-voltage signal REVN is set to 0 V.

The first and second high-voltage signals REV and REVN are supplied to a first and a second input terminal 27 and 28 of the charge pump circuit 2.

The output 2b of the charge pump circuit 2 is connected to a load capacitor 12.

Figure 2:
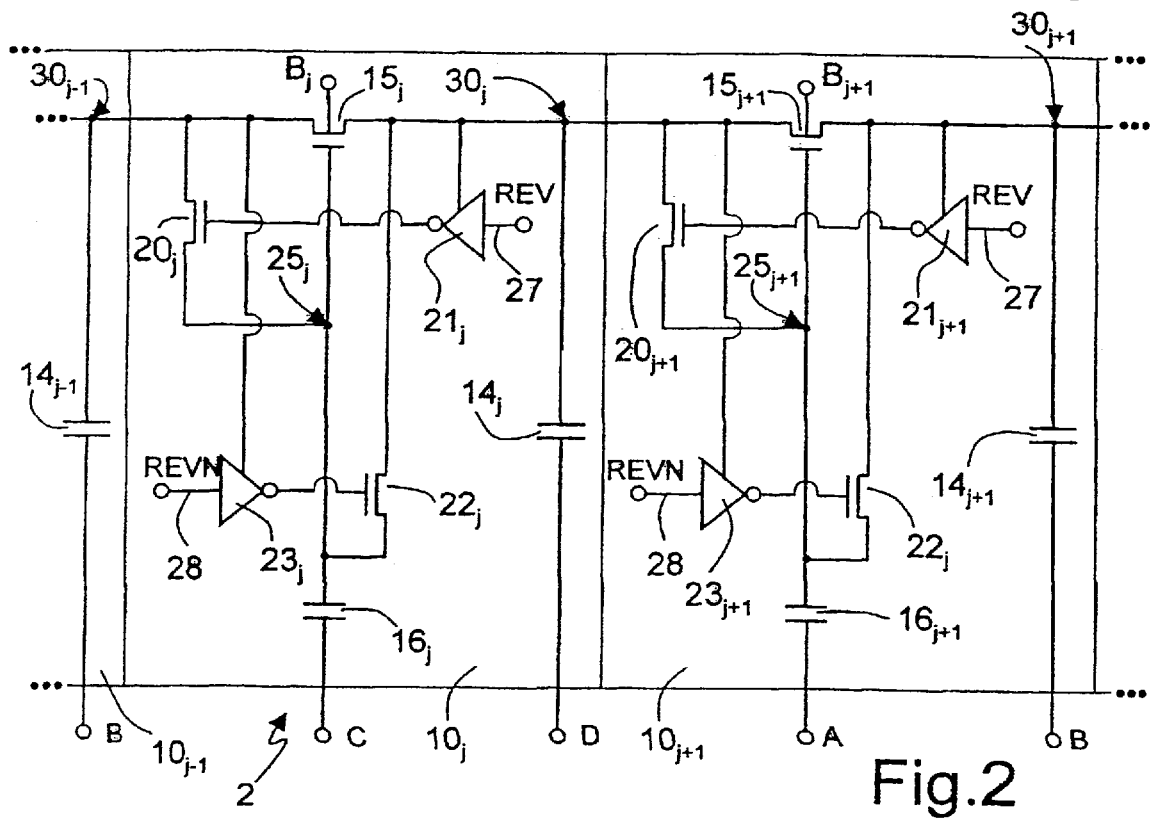
FIG. 2 illustrates a simplified circuit diagram of a circuit in FIG. 1.

FIG. 2 shows two voltage boosting stages of the charge pump circuit 2, indicated respectively at 10j and 10j+1, which have a same structure, but receive different phase signals, as previously described. For simplicity, only the voltage boosting stage 10j will be described, the components of which are identified by a reference number and by the letter j; the voltage boosting stage 10j+1 has identical components, which are identified by the same reference number and by j+1.

In detail, the voltage boosting stage 10j comprises a storage capacitor 14j; a charge transfer transistor 15j; a boost capacitor 16j; a first and a second precharge transistor 20j and 22j; and a first and a second inverter 21j, 23j.

Figure 7:
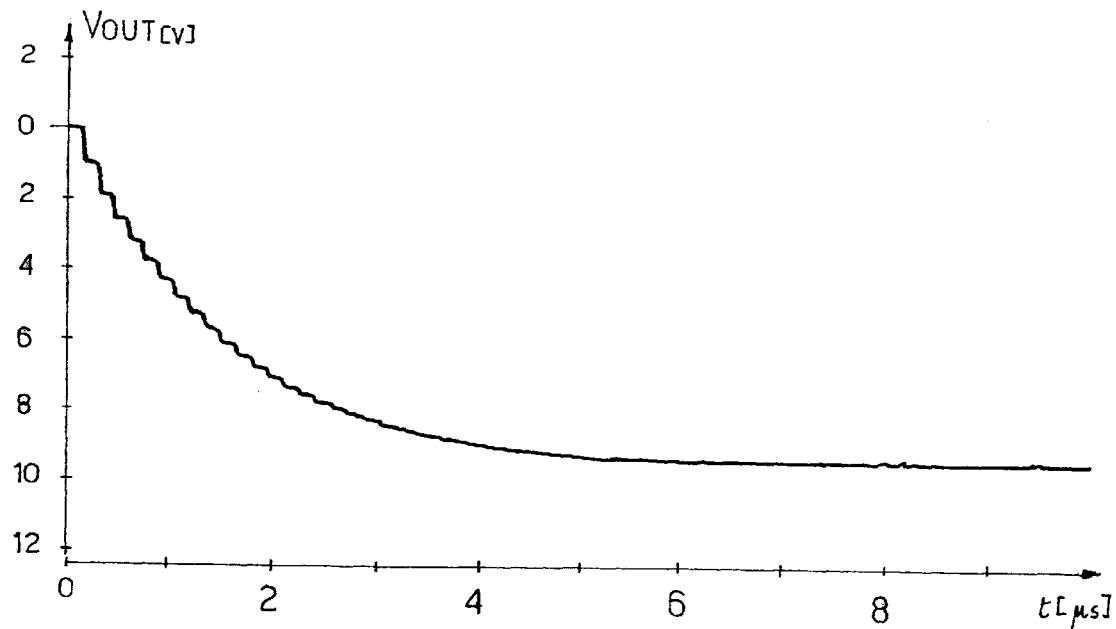
FIGS. 7 and 8 illustrate the plots respectively of the output voltage and the input current of the circuit of FIG. 5, in a first operation condition.

The storage capacitor 14j has a first terminal connected to a charge transfer node 30j, and a second terminal which receives the phase signal D. The charge transfer transistor 15j is connected between the charge transfer node 30j of the voltage boosting stage 10j, and a charge transfer node 30j−1 of a voltage boosting stage 10j−1, connected to the left of the voltage boosting stage 10j, and has a gate terminal connected to a precharge node 25j. In addition, the charge transfer transistor 15j is formed in triple well, as shown in FIG. 7, and has a bulk terminal Bj biased accordingly, as described hereinafter. The boost capacitor 16j has a first terminal connected to the precharge node 25j, and a second terminal which receives the phase signal C. The first precharge transistor 20j is connected between the charge transfer node 30j−1 of the voltage boosting stage 10j−1 and the precharge node 25j, and has a gate terminal connected to the output of the first inverter 21j; in turn, the latter has a signal input connected to the first input terminal 27 of the charge pump circuit 2 and receives the first high-voltage signal REV. The first inverter 21j further has a supply input connected to the charge transfer node 30j of the voltage boosting stage 10j. The second precharge transistor 22j is connected between the charge transfer node 30j and the precharge node 25j, and has a gate terminal connected to the output of the second inverter 23j; in turn, the latter has a signal input connected to the second input terminal 28 of the charge pump circuit 2, and receives the second high-voltage signal REVN. Furthermore, the second inverter 23j has a supply input connected to the charge transfer node 30j−1.

As already stated, the voltage boosting stage 10j+1 has the same structure, and differs from the voltage boosting device 10j only in that the storage capacitor 14j+1 receives the phase signal B, and the boost capacitor 16j+1 receives the signal A. Similarly, the voltage boosting stage 10j−1 (of which only the storage capacitor 14j−1 is shown) receives the signals A and B.

As indicated, when the charge pump circuit 2 must operate as a positive voltage boosting device, the first high-voltage signal REV is low, and the second high-voltage signal REVN is high; consequently, a conductive path is present between the node 30j and the gate terminal of the first precharge transistor 20j, which is thus on; on the other hand, the second inverter 23j connects the gate terminal of the second precharge transistor 22j to ground, and thus the second precharge transistor 22j is off. The voltage boosting stages 10j and 10j+1 of the charge pump circuit 2 can thus be represented as shown in FIG. 3.

Figure 5:
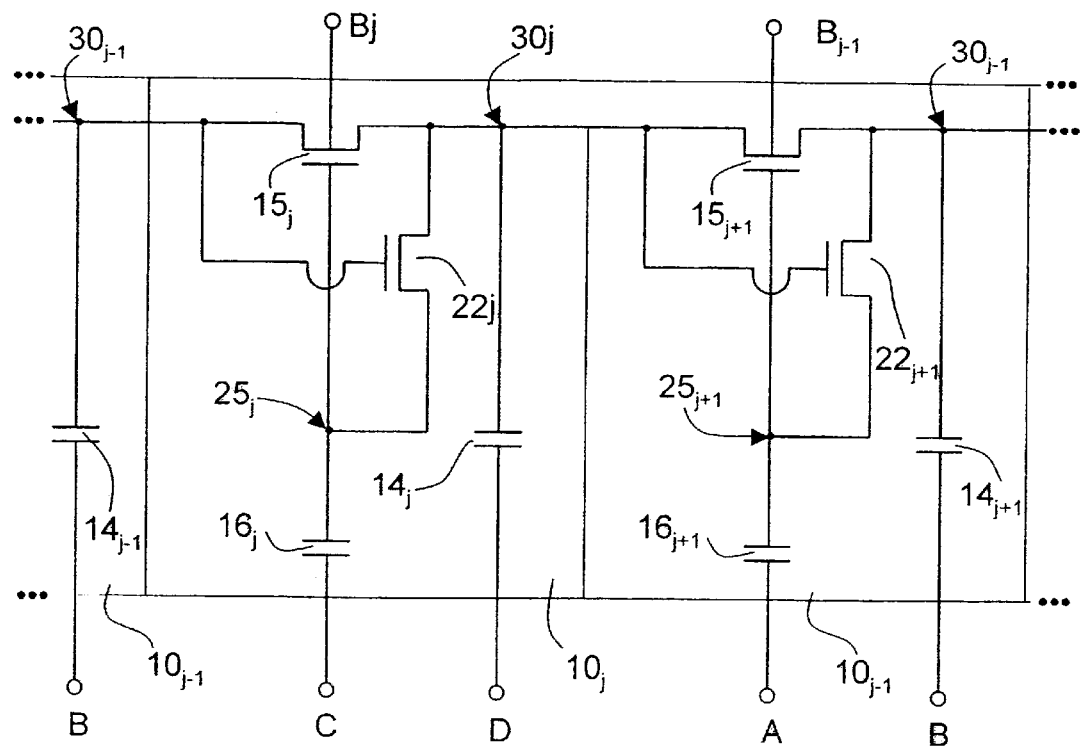
FIG. 5 shows the equivalent circuit to FIG. 2, when operating as a negative voltage boosting device.
Figure 6:
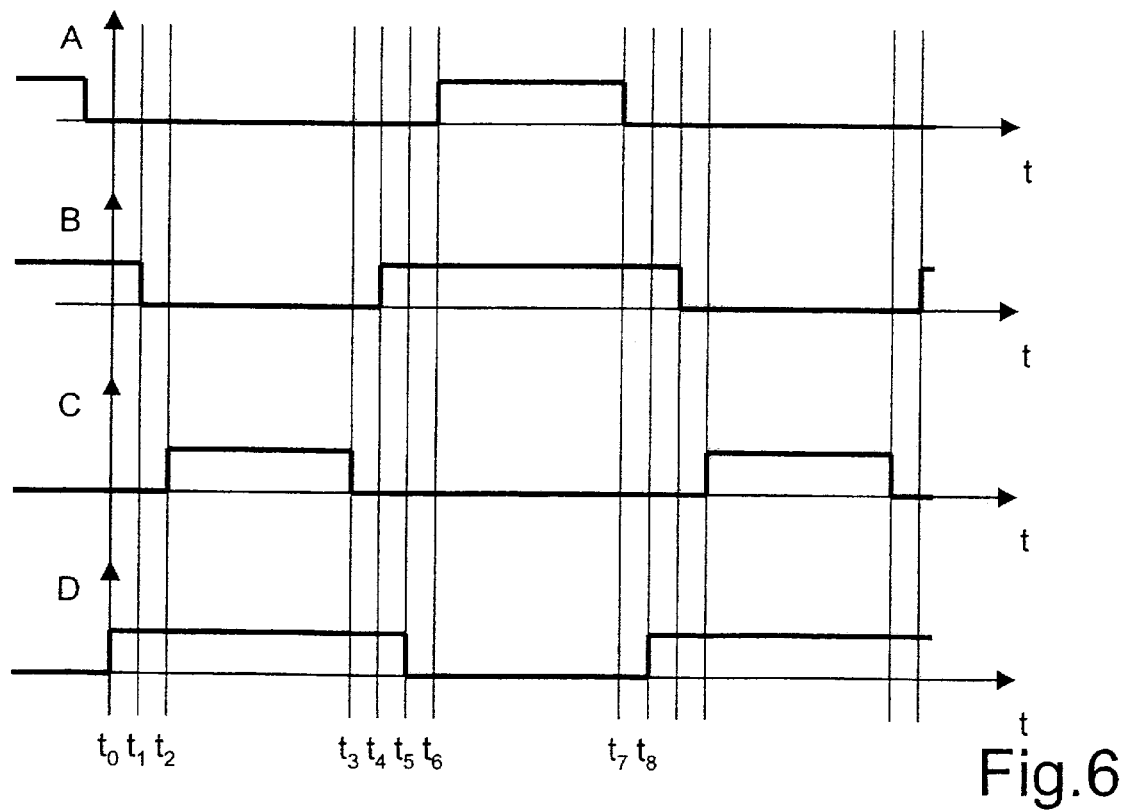
FIG. 6 shows the plot of the phase signals used by the circuit in FIG. 5.

On the other hand, when the charge pump circuit 2 must operate as a negative voltage boosting device, the first high-voltage signal REV is high, and the second high-voltage signal REVN is low; consequently, the second inverter 23j generates a conductive path between the charge transfer node 30j−1 and the gate terminal of the second precharge transistor 22j, which is on, whereas the first precharge transistor 20j is off. The voltage boosting stages 10j and 10j+1 of the charge pump circuit 2 can thus be represented as shown in FIG. 5.

The operation of the charge pump circuit 2 will thus be described with reference to FIG. 3 or 5, depending on the operation mode.

Figure 3:
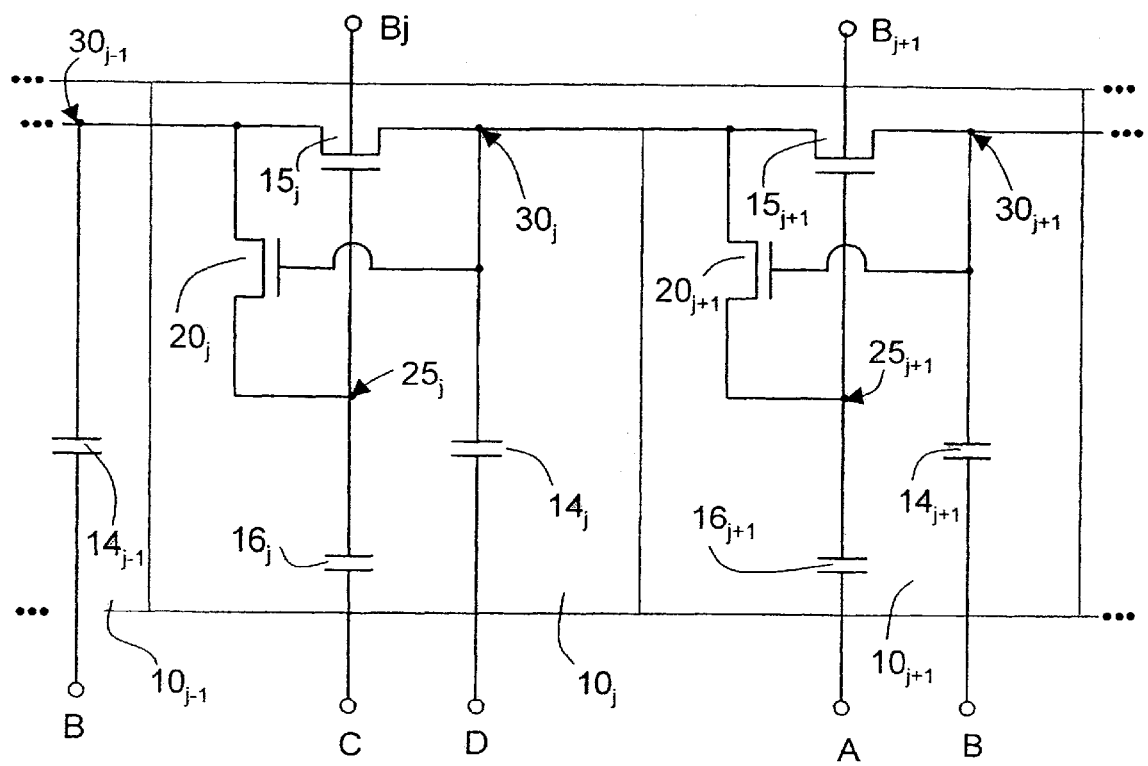
FIG. 3 shows the equivalent circuit to FIG. 2, when operating as a positive voltage boosting device.
Figure 4:
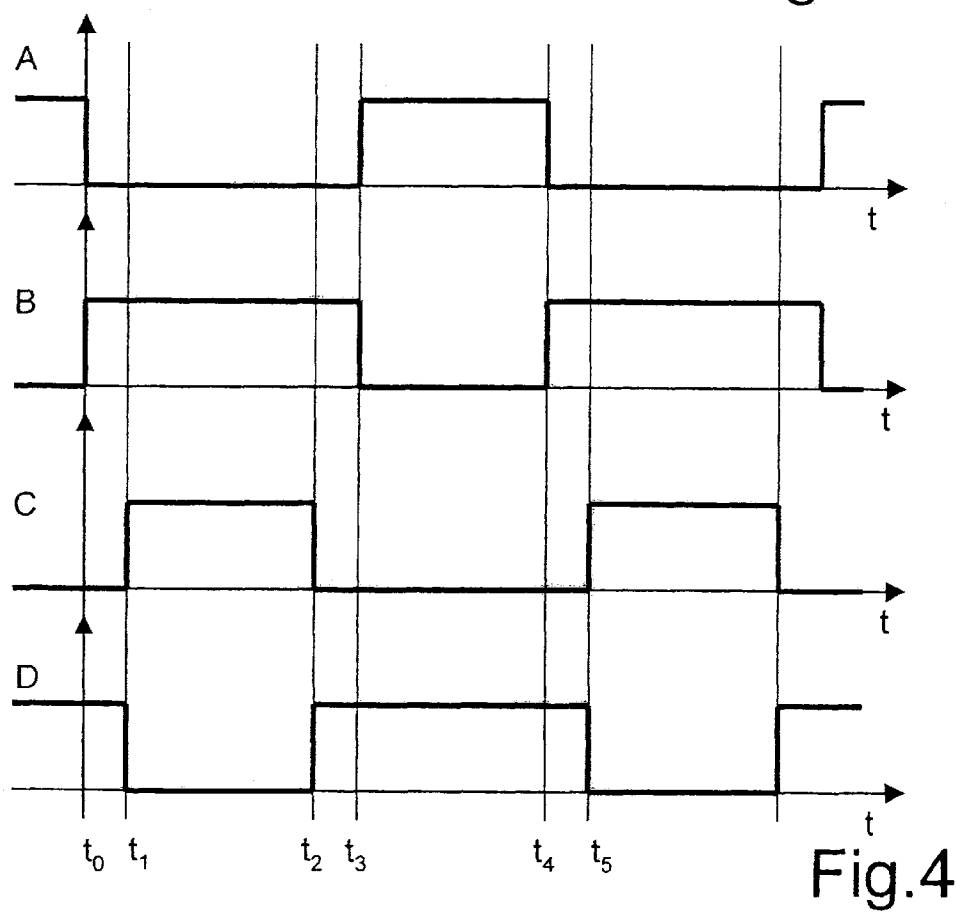
FIG. 4 shows the plot of the phase signals used by the circuit in FIG. 3.

With reference to FIG. 3, operation with a positive voltage boosting device will now be described. At instant to, phase signal A switches from high to low, signal B switches from low to high, and signals C and D are low and high respectively.

In this condition, the charge transfer nodes 30j−1 and 30j are at a high voltage (with values which are dependent on the number of preceding voltage boosting stages 10, with the transfer node 30j at a potential which is higher than that of the transfer node 30j−1), and the precharge node 25j is discharged, as will be explained in greater detail hereinafter; consequently, the first precharge transistor 20j of the voltage boosting stage 10j is on, and allows pre-charging of the precharge node 25j (and thus of the boost capacitor 16j), to the voltage present at the charge transfer node 30j−1 of the voltage boosting stage 10j−1. In addition, the charge transfer transistor 15j is off.

As soon as phase signals C and D switch respectively to the high state and low state (instant $t_1$), the first precharge transistor 20j switches off, and allows the precharge node 25j to go to a high voltage, at a value resulting from the sum of the voltage previously reached, plus the voltage of the high logic value of phase signal C (supply voltage $V_{DD}$). Consequently, the charge transfer transistor 15j switches on, and allows transfer of a charge package from the charge transfer node 30j−1 of the voltage boosting stage 10j−1 to the charge transfer node 30j of the voltage boosting stage 10j.

At instant $t_2$, phase signals C and D switch once more respectively to the low state and the high state, and the charge transfer node 30j is boosted, whereas the voltage of the precharge node 25j drops; consequently, the first precharge transistor 20j switches on, and allows discharge of the precharge node 25j to the charge transfer node 30j−1 of the voltage boosting stage 10j−1, and switching off of the charge transfer transistor 15j.

In this phase, the first precharge transistor 20j+1 of the voltage boosting stage 10j+1 is also on, and allows pre-charging of the node 25j+1 (and thus of the boost capacitor 16j+1), similarly to the process previously described for the voltage boosting stage 10j in the step comprised between instants t0 and t1.

At the instant t3, the phase signals A and B switch respectively to the high state and to the low state. The first precharge transistor 20j is on, and maintains the precharge condition of the precharge node 25j; the charge transfer transistor 15j continues to be off. Simultaneously, the charge transfer transistor 15+1 is on, and allows transfer of a charge quantum from the storage capacitor 14j of the voltage boosting stage 10j to the storage capacitor 14j+1 of the voltage boosting stage 10j+1.

Thereby, there is a gradual passage of charges from the input 2a to the output 2b of the charge pump circuit 2 (FIG. 1).

With reference to FIG. 5, the operation of the charge pump circuit 2 as a negative voltage boosting device will now be described. At instant t0, phase signal D switches from high to low, signals A and C are low, and signal B is high.

In this condition, the charge transfer nodes 30j−1 and 30j are at a high voltage (with values dependent on the number of preceding voltage boosting stages 10, with the charge transfer node 30j at a potential which is lower than that of the charge transfer node 30j−1); consequently, the second precharge transistor 22j of the voltage boosting stage 10j is on, and allows pre-charging of the precharge node 25j (and thus of the boost capacitor 16j), to the voltage present at the charge transfer node 30j of the voltage boosting stage 10j. In addition, the charge transfer transistor 15j is off.

As soon as phase signal B switches to the low state (instant t1), the second precharge transistor 22j switches off, and isolates the precharge node 25j. At instant t2, phase signal C switches to the high state, thus pushing the gate terminal of the charge transfer transistor 15j to a higher voltage than the charge transfer node 30j. The charge transfer transistor 15j switches on, and allows transfer of a charge quantum from the charge transfer node 30j of the voltage boosting stage 10j, to the charge transfer node 30j−1 of the voltage boosting stage 10j−1. Thereby, a passage of charge has been obtained from the output 2b to the input 2a of the charge pump circuit 2 (FIG. 1).

At the instant t3, phase signal C switches to the low state, thus removing voltage boosting from the gate terminal of the charge transfer transistor 15j. At instant t4, phase signal B switches to the high state, thus switching the second precharge transistor 22j on, thus allowing discharge of the precharge node 25j to the voltage present at the charge transfer node 30j; charge transfer transistor 15j switches off, and separates the charge transfer node 30j from the charge transfer node 30j−1. Simultaneously, the second precharge transistor 22j+1 is on, and allows pre-charging of the precharge node 25j+1.

At instant t5, phase signal D switches to the low state; consequently, the second precharge transistor 22j+1 of the voltage boosting stage 10j+1 switches off, similarly to the process previously described for the second precharge transistor 22j of the voltage boosting stage 10j, in the time interval t1-t2. At instant t6, phase signal A switches to the high state, thus pushing the precharge node 25j+1 to a high voltage; then, the charge transfer transistor 15j+1 of the voltage boosting stage 10j+1 switches on, and a charge quantum is transferred from the voltage boosting stage 10j+1 to the storage capacitor 14j of the voltage boosting stage 10j.

Thereby, there is a gradual passage of charges from the output 2b to the input 2a of the charge pump circuit 2 (FIG. 1).

Examples of duration and phasing of phase signals A, B, C and D are as follows: time intervals t0-t1, t1-t2, t3-t4, t4-t5 and t5-t6 are of 5 ns; time intervals t2-t3 and t6-t7 are of 60 ns.

Figure 8:
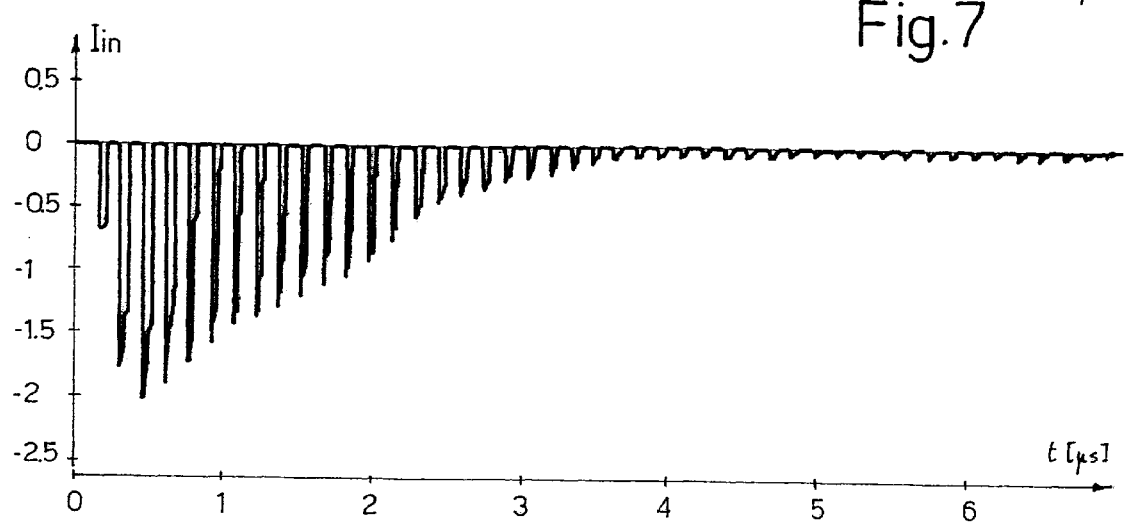
Figure 9:
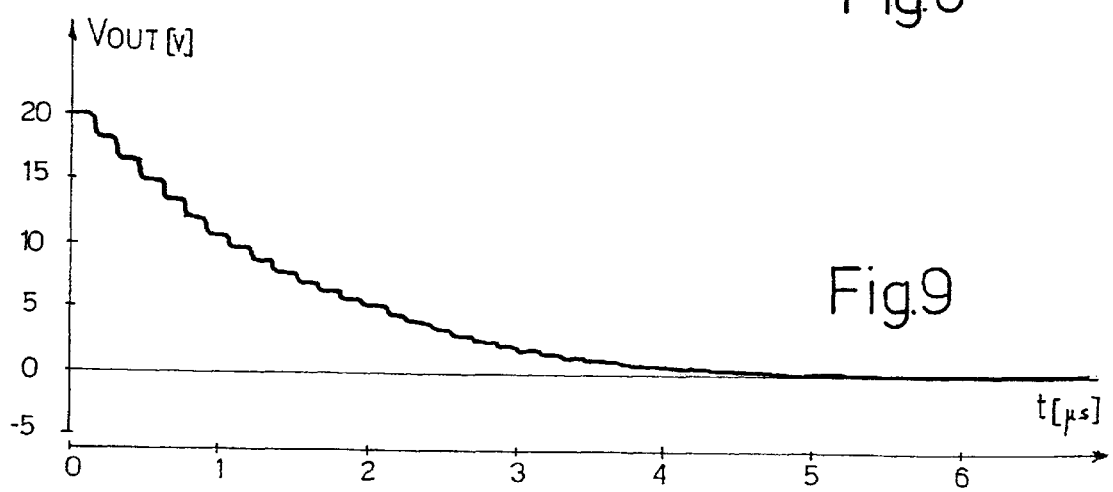
FIG. 9 shows the plot of the output voltage of the circuit of FIG. 5, in a second operation condition.

Consequently, with reference to FIG. 1, if the input 2a of the charge pump circuit 2 is grounded via the selector 8, positive charge is subtracted from the armature of the load capacitor 12, and the output voltage $V_{OUT}$ goes to a negative potential, as shown in FIG. 7; in this case, at the input 2a of the charge pump circuit 2, a passage of negative current is obtained (to ground) through charge quanta, as shown in FIG. 8. On the other hand, if the load capacitor 12 is loaded to a high voltage, and the input 2a of the charge pump circuit 2 is connected via the selector 8 to the supply line 7 (in the hypothesis that the latter is of the bidirectional type), charge is transferred from the load capacitor 12 (which is completely discharged) to the supply line 7, as shown in FIG. 9.

As previously stated, for obtaining a correct operation of the charge pump circuit 2, and reducing the body effect (which reduces the efficiency of the charge pump circuit 2), it has already been suggested to provide triple-well transistors that act as switches (charge transfer transistors 15), with a bulk region appropriately biased.

Figure 10:
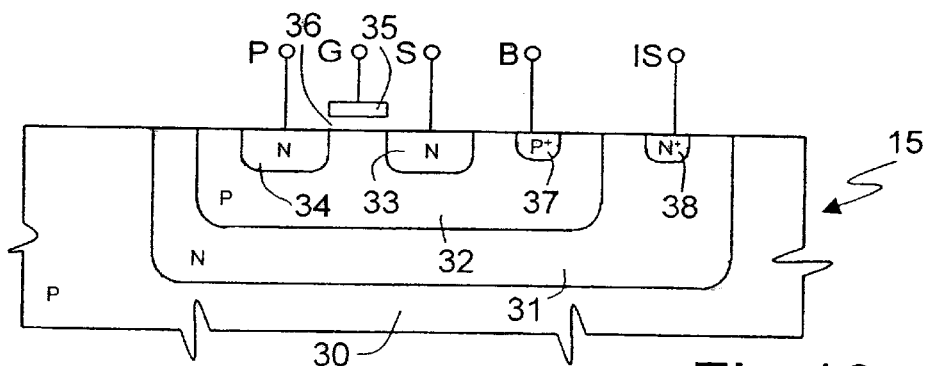
FIG. 10 shows a cross-section through a silicon chip, incorporating a detail of the circuit diagram of FIG. 2.

Consequently, charge transfer transistors 15 are implemented as shown in FIG. 10, which shows a portion of a chip of semiconductor material. In detail, in FIG. 10 a substrate 30 of P type accommodates an isolated well 31 of N type, which in turn accommodates a body well 32 of P type. Source regions 33 and drain regions 34 of N type are formed in the body well 32. A gate region 35, of polycrystalline silicon, extends above the substrate 30, and is isolated from the latter by a gate oxide region 36. A contact region 37 of P+ type is formed in the body well 32, and is connected to a body terminal B; a contact region 38 of N+ type is formed in the isolated well 31, and is connected to a biasing terminal IS. The body terminal B and biasing terminal IS allow biasing of the body well 32 and of the isolated well to appropriate potentials, such as to fulfil the conditions 1 and 2. initially described; for example, they can be connected to one another, and biased to a positive or negative voltage, depending on the operation condition of the charge pump circuit 2.

In particular, as shown in FIG. 2, the charge transfer transistors 15j and 15j+1 have separated body terminals Bj, Bj+1, connected respectively to a positive and to a negative biasing circuit, which are selectively enabled, according to the operation condition.

Figures 11, 12:
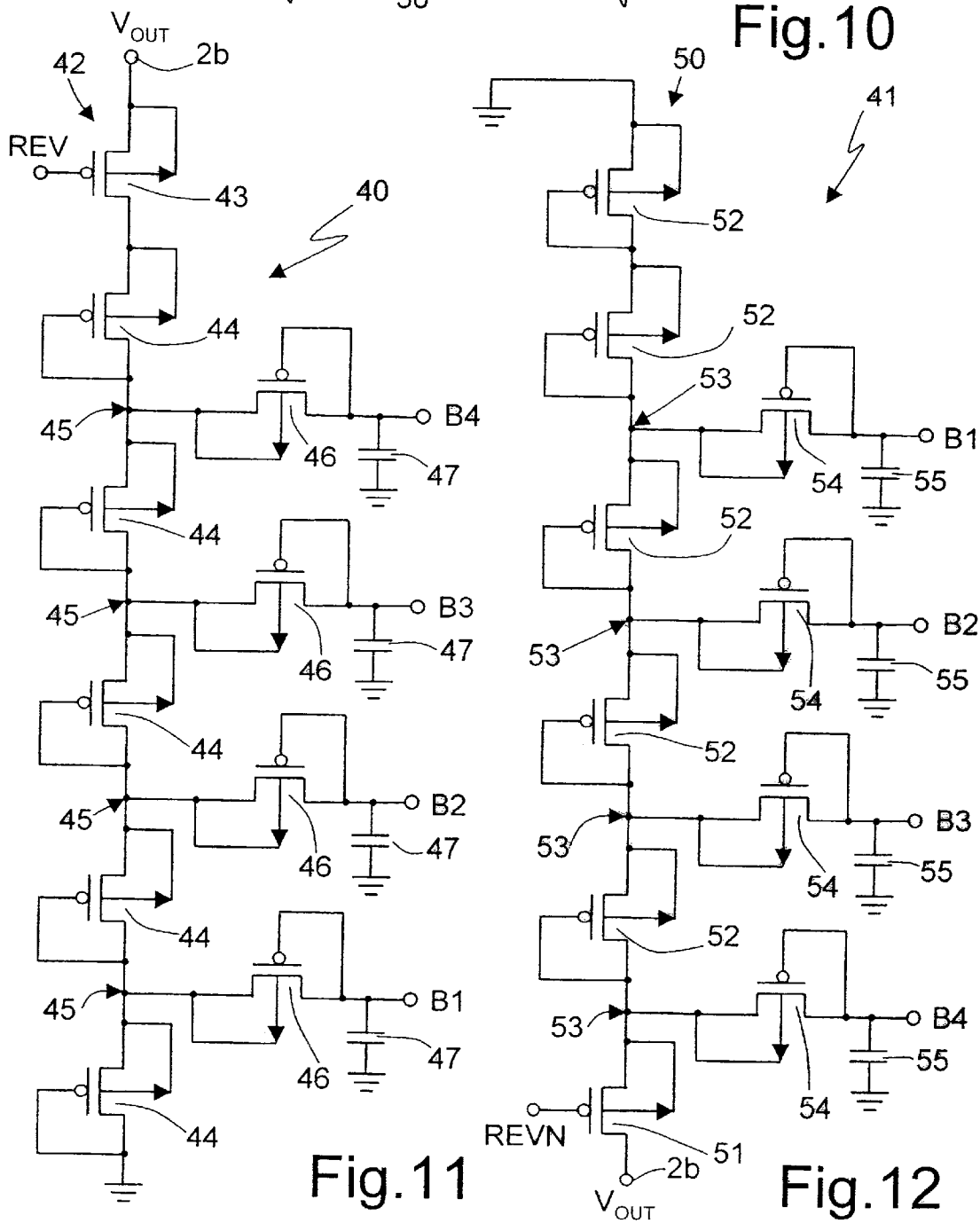
FIGS. 11 and 12 show simplified circuit diagrams of circuits used in the charge pump device of FIG. 1.

FIGS. 11 and 12 show an embodiment of a positive biasing circuit 40 and of a negative biasing circuit 41 respectively, for a charge pump circuit 2 with four voltage boosting stages 10.

In detail (FIG. 11), the positive biasing circuit 40 comprises a branch 42, connected between the output 2b of the charge pump circuit 2 and ground, and formed by an enabling transistor 43 of PMOS type, and five diode-connected transistors 44 of PMOS type. The enabling transistor 43 is connected to the output 2b through its own source terminal, and to the chain of PMOS transistor 44 through its own drain terminal, and receives at its gate terminal an enabling signal, for example the first high-voltage signal REV; the diode-connected transistors 44 define intermediate nodes 45, connected via a respective diode-connected PMOS transistor 46 to the bulk terminals B1, B2, B3 and B4. Filter capacitors 47 are interposed between the bulk terminals B1, B2, B3 and B4, and ground, in order to eliminate any voltage steps, caused by the discontinuous behavior of the output voltage $V_{OUT}$.

Thereby, the biasing voltage supplied to the bulk terminals B1, B2, B3, B4, has a value that is correlated dynamically to the voltage present at the adjacent charge transfer nodes 30 and satisfies the above-described conditions 1 and 2.

Similarly, in FIG. 12, the negative biasing circuit 41 comprises a branch 50 connected between the output 2b of the charge pump circuit 2 and ground, and comprising an enabling transistor 51 of PMOS type, and five diode-connected transistors 52 of PMOS type. The enabling transistor 43 is connected to the output 2b by its own drain terminal, and to the chain of diode-connected transistors 52 by its own source terminal, and receives at the gate terminal an enabling signal, for example the second high-voltage signal REVN; diode-connected PMOS transistors 54 connect intermediate nodes 53 to the bulk terminals B1, B2, B3 and B4. Filter capacitors 55 are also present here.

The voltage boosting device 1 has the following advantages. Firstly, it can operate in a bidirectional manner with a saving of surface area, since it is not necessary to have two separate voltage boosting devices for generating high voltages with a different sign.

Forming the switches through triple-well NMOS transistors and with symmetrical stages makes it possible to maintain the advantages of the architecture of a four-phase NMOS charge pump, in terms of efficiency and occupation of area.

The voltage boosting device 1 also operates as a bidirectional pump in current, which can transfer large quantities of charge from the input 2a to the output 2b or vice versa, thus preventing flows of charge through the charge transfer transistors 15 in a direction opposite to that required.

In addition, the described voltage boosting device has reduced current consumption, owing to the possibility of recovering the charge at the precharge node 25 during switching off of the charge transfer transistor 15, and supplying it to the adjacent storage capacitor 14 (phases t2-t3 for positive operation, and t4-t5 for negative operation, for voltage boosting stage 10j).

Finally, it is apparent that modifications and variants can be made to the voltage boosting device, without departing from the scope of the present invention. For example, using a simple logic circuit connected to the level translator 4, and a two-bit control signal LREV, it is possible to implement three different functioning conditions, i.e., in addition to the operation as a positive and negative voltage boosting device, operation without increasing the voltage, which can be obtained by setting both the high-voltage signals REV and REVN to a high level, such as to switch off both the first and the second precharge transistors 20, 22.

What is claimed is:

1. A voltage boosting device, comprising: a phase generator stage generating phase signals, and a charge pump circuit having an input and an output, and phase inputs receiving said phase signals, said charge-pump circuit comprising a plurality of voltage boosting stages cascade connected between said input and said output, each voltage boosting stage defining a first and a second transfer node, connected to a respective adjacent voltage boosting stage, each voltage boosting stage comprising:

a storage capacitor with a first and a second terminal, said first terminal of said storage capacitor receiving a first one of said phase signals, and said second terminal of said storage capacitor being connected to said second transfer node;

a switch element formed by an NMOS transistor having a first and a second conduction terminal and a control terminal, said first and second conduction terminals connected respectively to said first transfer node and to said second transfer node;

a voltage boosting capacitor, having a first terminal receiving a second one of said phase signals, and a second terminal connected to said control terminal of said switch element;

a first precharge circuit connected between said first transfer node and the control terminal of said switch element, so as to control charge transfer from said first transfer node to said second transfer node;

said first precharge circuit comprising an activation terminal receiving a first activation signal, and said charge pump circuit additionally comprising a second precharge circuit, connected between said second transfer node and said control terminal of said switch element so as to control charge transfer from said second transfer node to said first transfer node, said second precharge circuit having an activation terminal receiving a second activation signal, said first and second activation signals never being active simultaneously.

2. The voltage boosting device of claim 1, comprising means for deactivating said first and second precharge circuit.

3. The voltage boosting device of claim 1, wherein said first and second precharge circuits comprise respectively a first and a second precharge transistor, said first precharge transistor having a first conduction terminal connected to said first transfer node, a second conduction terminal connected to said control terminal of said switch element, and a control terminal connected to said second transfer node through a first enabling element, said second precharge transistor having a first conduction terminal connected to said second transfer node, a second conduction terminal connected to said control terminal of said switch element, and a control terminal connected to said first transfer node through a second enabling element, said first and second enabling elements receiving said respective disabling signals.

4. The voltage boosting device of claim 3, wherein said first and second enabling elements each comprise a respective high-voltage inverter having a signal input receiving respectively a first and a second high-voltage logic signal switching between a first and a second level, a supply input connected respectively to said second and said first transfer nodes, and an output connected to said control terminal, respectively of said first and said second precharge transistors.

5. The voltage boosting device of claim 3, wherein said first and second precharge transistors comprise an NMOS precharge transistor.

6. The voltage boosting device of claim 1, wherein the NMOS transistor forming said switch element is of triple-well type.

7. The voltage boosting device of claim 6, wherein the NMOS transistors forming switch elements of adjacent voltage boosting stages have independent bulk terminals and receive respective biasing signals having a value correlated to the voltage at said first and second transfer nodes of the respective voltage boosting stage.

8. The voltage boosting device of claim 7, comprising a first and a second biasing circuit, said first and second biasing circuits connected between said output of said charge pump circuit and a reference potential line, and each comprising a respective enabling switch that receives a respective power-on signal.

9. The voltage boosting device of claim 1, wherein said phase generator stage comprises a control input that receives an operation mode signal having at least one first and one second value, and outputs supplying different phase signals on the basis of the value of said operation mode signal.

10. A method for boosting a voltage at an input of a voltage boosting device having a phase generator stage generating phase signals, and a charge pump circuit having an input and an output, and phase inputs receiving said phase signals, said charge-pump circuit comprising a plurality of voltage boosting stages cascade connected between said input and said output, each voltage boosting stage defining a first and a second transfer node connected to a respective adjacent voltage boosting stage, each voltage boosting stage comprising a storage capacitor with a first and a second terminal, said first terminal of said storage capacitor receiving a first one of said phase signals, and said second terminal of said storage capacitor connected to said second transfer node; a switch element formed by an NMOS transistor interposed between said first and second charge transfer nodes and having a control terminal; a voltage boosting capacitor having a first terminal receiving a second one of said phase signals, and a second terminal connected to said control terminal of said switch element; the method comprising:

receiving an operation mode signal having a first and a second value;

generating different phase signals on the basis of the value of the operation mode signal; and selectively enabling a first or a second precharge circuit connected to said control terminal of said switch element in each voltage boosting stage in response to the different phase signals, thereby selectively controlling transfer of electric charges from said first to said second transfer node, and transfer of electric charges from said second to said first transfer node.

11. The method of claim 10 wherein, when said operation mode signal has said first value, the method comprises:

disabling said second precharge circuit;

activating said first precharge circuit;

switching off said switch element;

charging said control terminal of said switch element through said first transfer node;

deactivating said first precharge circuit;
switching on said switch element;
transferring electric charges from said first transfer node to said second transfer node;
activating said first precharge circuit;
discharging said control terminal of said switch element to said first transfer node; and
switching off said switch element.

12. The method of claim 10 wherein, when said operation mode signal has said second value, the method comprises:
disabling said first precharge circuit;
activating said second precharge circuit;
switching off said switch element;
charging said control terminal of said switch element through said second transfer node;
deactivating said second precharge circuit;
switching on said switch element;
transferring electric charges from said second transfer node to said first transfer node;
activating said second precharge circuit;
discharging said control terminal of said switch element to said second transfer node; and
switching off said switch element.

13. A voltage boosting circuit, comprising: a plurality of voltage boosting stages connected in cascade, each voltage boosting stage connected to adjacent stages by first and second transfer nodes;
each voltage boosting stage comprising a switch element with a first terminal coupled to the first transfer node, a second terminal coupled to a second transfer node, and a control terminal;
a first precharge circuit comprising a first terminal coupled to the first transfer node, a second terminal coupled to the control terminal of the switch element, and a control terminal coupled to a first activation signal source, the first precharge circuit configured to control charge transfer from the first transfer node to the second transfer node in response to a first activation signed from the first activation signed source; and
a second precharge circuit comprising a first terminal coupled to the second transfer node, a second terminal coupled to the control terminal of the switch element, and a control terminal coupled to a second activation signal source, the second precharge circuit configured to control charge transfer from the second transfer node to the first transfer node in response to a second activation signed from the second activation signed source.

14. The circuit of claim 13, wherein the first activation signal source and the second activation signal source are configured to alternate output of their respective activation signals so that the first and second activation signals are never on at the same time.

15. The circuit of claim 13, wherein the first precharge circuit comprises a first precharge transistor having a first terminal coupled to the first transfer node, a second terminal coupled to the control terminal of the switch element, and a control terminal coupled to the second transfer node through a first high-voltage inverter having a signal input receiving the first activation signal that comprises a high-voltage logic signal switching between a first and a second level, a supply input connected to the second transfer node, and an output coupled to the control terminal of the first precharge transistor; the second precharge circuit comprising a second precharge transistor having a first terminal coupled to the second transfer node, a second terminal coupled to the control terminal of the switch element, and a control terminal coupled to the first transfer node through a second high-voltage inverter having a signal input receiving the second activation signal that comprises a high-voltage logic signal switching between a first and a second level, a signal input coupled to the first transfer node, and an output coupled to the control terminal of the second precharge transistor.

16. The circuit of claim 15, wherein the switch element of each voltage boosting stage comprises NMOS transistors having independent bulk terminals and receiving respective biasing signals having a value correlated to the voltage at the first and second transfer nodes of the respective voltage boosting stage.

17. The circuit of claim 16, comprising a first and a second biasing circuit, the first and second biasing circuits coupled between an output of the voltage boosting circuit and a reference potential line, and each of the first and second biasing circuits comprising a respective enabling switch that receives a respective power-on signal.

18. The circuit of claim 17, comprising a phase generator stage configured to generate respective phase signals for each of the voltage boosting circuits, the phase generator stage comprising a control input that receives an operation mode signal having at least one first and one second value and an output supplying different phase signals on the basis of the value of the operation mode signal.

* * * * *

UNITED STATES PATENT AND TRADEMARK OFFICE
CERTIFICATE OF CORRECTION

PATENT NO. : 6,448,842 B2  Page 1 of 1
DATED : September 10, 2002
INVENTOR(S) : Mauro Zanuccoli et al.

It is certified that error appears in the above-identified patent and that said Letters Patent is hereby corrected as shown below:

<u>Title page,</u>
Item [30], Foreign Application Priority Data, "TO20A0146" should read as
-- TO00A0146 --.

Signed and Sealed this

Twentieth Day of May, 2003

JAMES E. ROGAN
*Director of the United States Patent and Trademark Office*